(12) United States Patent
Okada et al.

(10) Patent No.: US 12,421,380 B2
(45) Date of Patent: Sep. 23, 2025

(54) ACRYLIC COPOLYMER AND RUBBER MATERIAL

(71) Applicant: OSAKA SODA CO., LTD., Osaka (JP)

(72) Inventors: Ryo Okada, Osaka (JP); Shinichi Udo, Osaka (JP); Motoki Kitagawa, Osaka (JP); Masatsugu Naitou, Osaka (JP)

(73) Assignee: OSAKA SODA CO., LTD., Osaka (JP)

( * ) Notice: Subject to any disclaimer, the term of this patent is extended or adjusted under 35 U.S.C. 154(b) by 359 days.

(21) Appl. No.: 17/267,195

(22) PCT Filed: Aug. 8, 2019

(86) PCT No.: PCT/JP2019/031368
§ 371 (c)(1),
(2) Date: Feb. 9, 2021

(87) PCT Pub. No.: WO2020/032173
PCT Pub. Date: Feb. 13, 2020

(65) Prior Publication Data
US 2021/0309846 A1    Oct. 7, 2021

(30) Foreign Application Priority Data

Aug. 10, 2018  (JP) .................. 2018-151751
Feb. 21, 2019  (JP) .................. 2019-029838

(51) Int. Cl.
C08L 33/08 (2006.01)
C08F 220/18 (2006.01)
C08F 222/40 (2006.01)

(52) U.S. Cl.
CPC ........ *C08L 33/08* (2013.01); *C08F 220/1802* (2020.02); *C08F 220/1804* (2020.02); *C08F 222/406* (2020.02); *C08L 2201/08* (2013.01); *C08L 2312/00* (2013.01)

(58) Field of Classification Search
None
See application file for complete search history.

(56) References Cited

U.S. PATENT DOCUMENTS

| | | | | |
|---|---|---|---|---|
| 5,171,768 A | * | 12/1992 | Prentice | C08F 279/02 524/460 |
| 6,388,015 B1 | * | 5/2002 | Aimura | C08L 15/005 525/193 |
| 2005/0157399 A1 | | 7/2005 | Hanamura | |
| 2008/0213692 A1 | | 9/2008 | Hanamura | |
| 2010/0323141 A1 | | 12/2010 | Kawasaki et al. | |

FOREIGN PATENT DOCUMENTS

| | | | | |
|---|---|---|---|---|
| CN | 102492084 A | 6/2012 | | |
| EP | 1108731 A2 | 6/2001 | | |
| EP | 1548497 A1 | * 6/2005 | ........... | G03F 7/0007 |
| JP | 63196637 A | * 8/1988 | | |
| JP | S 63-196637 A | 8/1988 | | |
| JP | H 02-051569 A | 2/1990 | | |
| JP | H 10-158466 A | 6/1998 | | |
| JP | 2003192746 A | * 7/2003 | | |
| JP | 2005-49720 A | 2/2005 | | |
| JP | 2005049720 A | * 2/2005 | ............. | G03F 7/022 |
| JP | 2005-189399 A | 7/2005 | | |
| JP | 2006-209113 A | 8/2006 | | |
| JP | 2009-209268 A | 9/2009 | | |
| JP | 2011012216 A | * 1/2011 | ............... | H02G 3/32 |
| JP | 2011-195614 A | 10/2011 | | |
| JP | 2012188554 A | * 10/2012 | | |
| JP | 2013-231169 A | 11/2013 | | |
| JP | 2015-067699 A | 4/2015 | | |
| KR | 2017-0003404 A | 1/2017 | | |
| WO | WO 2009/099113 A1 | 8/2009 | | |
| WO | WO-2017073287 A1 | * 5/2017 | | |

OTHER PUBLICATIONS

JP-63196637-A, Aug. 1988, Machine translation (Year: 1988).*
JP-2003192746-A, Jul. 2003, machine transition (Year: 2003).*
WO 2017073287 A1, May 2017 (Year: 2017).*
JP-2005049720-A, Feb. 2005, Machine translation (Year: 2005).*
JP-2011012216-A, Jan. 2011, machine translation (Year: 2011).*
Niemiec, Polymer Testing, 1, 1980, 201-209 (Year: 1980).*
JP-2012188554-A, 2012, Machine translation (Year: 2012).*
Chinese Office Action in Chinese Patent Application No. 201980043863.8 issued Mar. 31, 2022.
Extended European Search Report in European Patent Application No. 19847394.4 issued Apr. 28, 2022.
International Search Report in PCT/JP2019/031368, issued Oct. 29, 2019.
Japanese Office Action in Japanese Patent Application No. 2020-535876 issued Jul. 27, 2021.

* cited by examiner

*Primary Examiner* — Satya B Sastri
(74) *Attorney, Agent, or Firm* — Knobbe, Martens, Olson & Bear, LLP

(57) ABSTRACT

It is an object of the present invention to provide an acrylic copolymer for providing a highly heat-resistant rubber material that shows a small rate of change in strength without loss of elongation, even under a high-temperature condition over a long period, and a composition containing the acrylic copolymer. The present invention provides an acrylic copolymer comprising a structural unit (A) derived from a monomer containing a structure having a maleimide skeleton, a structural unit (B) derived from an acrylic acid alkyl ester and/or a structural unit (B) derived from an acrylic acid alkoxyalkyl ester, and a structural unit (C) derived from an unsaturated monomer having a crosslinking group; a composition comprising the acrylic copolymer and a crosslinking group; and a rubber material produced from the composition.

7 Claims, No Drawings

ACRYLIC COPOLYMER AND RUBBER MATERIAL

TECHNICAL FIELD

The present invention relates to an acrylic copolymer and a rubber material therefrom, and more particularly relates to an acrylic copolymer that can provide a highly heat-resistant rubber material whose mechanical properties, such as strength, are less likely to decrease, even after exposure to a high temperature for a long time, and a rubber material produced from the acrylic copolymer.

BACKGROUND ART

In general, acrylic polymers, which are polymers produced using (meth)acrylic acid esters as main raw materials, are known as materials having excellent physical properties related to durability. Such acrylic polymers are extensively used as rubber materials for industrial use or for automotive use, such as engine gaskets, oil hoses, air hoses, O-rings, and the like.

However, such rubber members for automotive use, particularly rubber members used in engine compartments, have been required to be further improved in heat resistance, for example, to show a less decrease in physical properties even under a high-temperature condition over a long period, because of the improved performance of turbochargers that accompanied the increased output of engines, and the recent reinforcement of exhaust gas regulations.

In particular, these rubber members such as hoses and packings used in automobile-related and other areas have been required to show not only a small rate of change in elongation, but also a small rate of change in strength such as strength or modulus, after long-term heating. However, because there is a trade-off between these properties, it is difficult to improve both properties simultaneously.

Under such circumstances, Patent Literature 1 discloses an acrylic rubber obtained by copolymerizing an acrylic acid ester, a methacrylic acid alkyl ester, and a crosslinking monomer. Patent Literature 1 states that this acrylic rubber has a small rate of change in tensile strength and a small rate of change in elongation at break before and after heat aging, and the above-described specific combination is most preferably a combination of methyl methacrylate and glycidyl methacrylate in terms of heat aging resistance. However, even this acrylic rubber shows a significant decrease in elongation at break or strength after experiencing a thermal history. A rubber material superior in heat resistance is therefore desired.

Patent Literature 2 discloses an acrylic rubber composition obtained by copolymerizing acrylic rubber with a small amount of a diphenylamine structure-containing monomer unit, in order to improve the heat resistance by the copolymerization with a small amount of the monomer unit.

However, although Patent Literature 2 mentions the rate of change in elongation after air heat aging, it does not mention an improvement in mechanical properties, such as strength and modulus.

CITATION LIST

Patent Literature

Patent Literature 1: WO 2009/099113
Patent Literature 2: JP 2009-209268 A

SUMMARY OF INVENTION

Technical Problem

It is an object of the present invention to provide an acrylic copolymer for providing a highly heat-resistant rubber material that shows a small rate of change in strength without loss of elongation, even under a high-temperature condition over a long period, and a composition containing the acrylic copolymer.

Solution to Problem

As a result of their extensive research, the present inventors have found that the object can be achieved by an acrylic copolymer comprising a structural unit (A) derived from a monomer containing a structure having a maleimide skeleton, a structural unit (B) derived from a (meth)acrylic acid alkyl ester and/or a structural unit (B) derived from a (meth)acrylic acid alkoxyalkyl ester, and a structural unit (C) derived from an unsaturated monomer having a crosslinking group, a composition comprising the (meth)acrylic copolymer and a crosslinking group, and a rubber material produced from the composition, thus completing the present invention.

Embodiments of the Present Invention are as Follows

Item 1. An acrylic copolymer comprising a structural unit (A) derived from a monomer containing a structure having an N-substituted maleimide represented by the following general formula (I), a structural unit (B) derived from a (meth)acrylic acid alkyl ester and/or a structural unit (B) derived from a (meth)acrylic acid alkoxyalkyl ester, and a structural unit (C) derived from an unsaturated monomer having a crosslinking group:

[Formula 1]

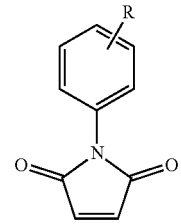

(I)

wherein R is any of an anilino group ($C_6H_5$—NH—) optionally having a substituent, a hydrogen atom, an alkyl group, an aromatic group (that optionally forms a fused ring structure), a hydroxyl group, and an alkoxy group.

Item 2. The acrylic copolymer according to item 1, wherein the structural unit (A) derived from a monomer containing a structure having a maleimide skeleton represented by general formula (I) is a structural unit derived from N-(4-anilinophenyl)maleimide.

Item 3. The acrylic copolymer according to item 1, wherein the structural unit (A) derived from a monomer containing a structure having a maleimide skeleton represented by general formula (I) is a structural unit derived from hydroxyphenyl maleimide.

Item 4. The acrylic copolymer according to any one of items 1 to 3, wherein the structural unit (C) derived from an unsaturated monomer having a crosslinking group is any of a structural unit derived from an unsaturated monomer having a halogen group, a structural unit derived from an unsaturated monomer having a carboxy group, and a structural unit derived from an unsaturated monomer having an epoxy group.

Item 5. The acrylic copolymer according to any one of items 1 to 4, wherein the acrylic copolymer comprises a structural unit derived from a methacrylic acid alkyl ester.

Item 6. An acrylic copolymer-containing composition comprising the acrylic copolymer according to any one of items 1 to 5 and a crosslinking agent.

Item 7. A rubber material produced from the acrylic copolymer-containing composition according to item 6.

Advantageous Effects of Invention

The composition containing the acrylic copolymer of the present invention has excellent processability, and the rubber material produced using (specifically a crosslinked product obtained by crosslinking) the composition containing the acrylic copolymer of the present invention is excellent in physical properties under normal conditions and heat resistance under a long-term high-temperature condition, and particularly does not lose its mechanical properties, such as strength and modulus. Therefore, the rubber material is suitable for use as rubber materials for automotive use, such as fuel system hoses or air system hoses, and tube materials.

DESCRIPTION OF EMBODIMENTS

An acrylic copolymer of the present invention will be described first.

The acrylic copolymer of the present invention is an acrylic copolymer comprising a structural unit (A) derived from a monomer containing a structure having an N-substituted maleimide represented by the following general formula (I), a structural unit (B) derived from a (meth)acrylic acid alkyl ester and/or a structural unit (B) derived from a (meth)acrylic acid alkoxyalkyl ester, and a structural unit (C) derived from an unsaturated monomer having a crosslinking group:

[Formula 2]

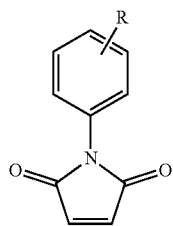

(I)

wherein R is any of an anilino group ($C_6H_5$—NH—) optionally having a substituent, a hydrogen atom, an alkyl group, an aromatic group (that optionally forms a fused ring structure), a hydroxyl group, and an alkoxy group.

As used herein, "(meth)acrylic acid" refers to "acrylic acid or "methacrylic acid". The same applies to similar expressions.

In the structural unit (A) derived from a monomer containing a structure having an N-substituted maleimide represented by general formula (I), there may be a single R or a plurality of R's in general formula (I), and R is preferably any of an anilino group ($C_6H_5$—NH—) optionally having a substituent, a hydrogen atom, a $C_{1-3}$ alkyl group, an aromatic group (that optionally forms a fused ring structure), a hydroxyl group, and a $C_{1-3}$ alkoxy group, and more preferably an anilino group ($C_6H_5$—NH—) optionally having a substituent, a hydroxyl group, a hydrogen atom, or a $C_{1-2}$ alkyl group.

The functional group that may be substituted on the anilino group is preferably any of an alkyl group, an aromatic group (that optionally forms a fused ring structure), a hydroxyl group, and an alkoxy group, more preferably any of a $C_{1-3}$ alkyl group, an aromatic group (that optionally forms a fused ring structure), a hydroxyl group, and a $C_{1-3}$ alkoxy group, and particularly preferably a $C_{1-2}$ alkyl group.

Examples of the structural unit (A) derived from a monomer containing a structure having an N-substituted maleimide represented by general formula (I), wherein R is an anilino group ($C_6H_5$—NH—) optionally having a substituent, include a monomer containing a structure having an N-substituted maleimide represented by the following general formula (II):

[Formula 3]

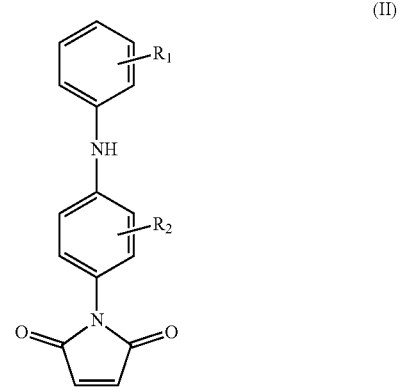

(II)

wherein $R_1$ and $R_2$ are each any of a hydrogen atom, an alkyl group, an aromatic group (that optionally forms a fused ring structure), a hydroxyl group, and an alkoxy group.

In the structural unit (A) derived from a monomer containing a structure having an N-substituted maleimide represented by general formula (II), $R_1$ and $R_2$ may be the same or different, and are each preferably any of a hydrogen atom, a $C_{1-3}$ alkyl group, an aromatic group (that optionally forms a fused ring structure), a hydroxyl group, and a $C_{1-3}$ alkoxy group, and more preferably a hydrogen atom or a $C_{1-2}$ alkyl group.

Specific examples of the monomer unit (A) containing a structure having an N-substituted maleimide represented by general formula (I) include N-(4-anilinophenyl)maleimide, N-(4-p-toluidinylphenyl)maleimide, N-(4-anilino-1-naphthyl)maleimide, 4-hydroxyphenyl maleimide, 3-hydroxyphenyl maleimide, and like hydroxyphenyl maleimides. These monomer units each containing a structure having an N-substituted maleimide may be used alone or in combination.

The content of the structural unit (A) derived from a monomer containing a structure having an N-substituted maleimide represented by general formula (I) in the acrylic copolymer of the present invention, relative to the total content of structural units in the acrylic copolymer, is as follows: the lower limit is preferably 0.1% by mass or more, more preferably 0.2% by mass or more, and particularly preferably 0.3% by mass or more, while the upper limit is preferably 10% by mass or less, more preferably 5% by mass or less, and particularly preferably 2.5% by mass or less. Preferred ranges of the content of the structural unit (A) include from 0.1 to 10% by mass; from 0.1 to 5% by mass; from 0.1 to 2.5% by mass; from 0.2 to 10% by mass; from 0.2 to 5% by mass; from 0.2 to 2.5% by mass; from 0.3 to 10% by mass; from 0.3 to 5% by mass; and from 0.3 to 2.5% by mass.

The structural unit (B) derived from a (meth)acrylic acid alkyl ester and/or the structural unit (B) derived from a (meth)acrylic acid alkoxyalkyl ester is preferably a structural unit derived from a (meth)acrylic acid ester having a $C_{1-12}$ alkyl group and/or a structural unit derived from a (meth)acrylic acid ester having a $C_{2-8}$ alkoxyalkyl group, more preferably a structural unit derived from a (meth)acrylic acid alkyl ester having a $C_{2-6}$ alkyl group and/or a structural unit derived from a (meth)acrylic acid alkoxyalkyl ester having a $C_{2-6}$ (meth)alkoxyalkyl group, and particularly preferably a structural unit derived from a (meth)acrylic acid alkyl ester having a $C_{2-4}$ alkyl group and/or a structural unit derived from a (meth)acrylic acid alkoxyalkyl ester having a $C_{2-4}$ alkoxyalkyl group. The structural unit (B) may be a structural unit derived from a single (meth)acrylic acid ester or two or more (meth)acrylic acid esters.

The acrylic copolymer of the present invention preferably contains a structural unit derived from an acrylic acid alkyl ester as the structural unit derived from a (meth)acrylic acid alkyl ester. Specific examples of the structural unit derived from an acrylic acid alkyl ester include structural units derived from acrylic acid esters, such as methyl acrylate, ethyl acrylate, n-propyl acrylate, isopropyl acrylate, n-butyl acrylate, isobutyl acrylate, n-pentyl acrylate, n-hexyl acrylate, n-heptyl acrylate, n-octyl acrylate, n-dodecyl acrylate, 2-ethylhexyl acrylate, and cyclohexyl acrylate. Structural units derived from ethyl acrylate and n-butyl acrylate are preferred.

The acrylic copolymer of the present invention preferably contains a structural unit derived from an acrylic acid alkoxyalkyl ester as the structural unit derived from a (meth)acrylic acid alkoxyalkyl ester. Specific examples of the structural unit derived from an acrylic acid alkoxyalkyl ester include structural units derived from acrylic acid esters, such as methoxymethyl acrylate, methoxyethyl acrylate, ethoxymethyl acrylate, 2-ethoxyethyl acrylate, 2-propoxyethyl acrylate, 2-butoxyethyl acrylate, 2-methoxypropyl acrylate, 2-ethoxypropyl acrylate, 3-methoxypropyl acrylate, 3-ethoxypropyl acrylate, 4-methoxybutyl acrylate, and 4-ethoxybutyl acrylate. A structural unit derived from methoxyethyl acrylate is preferred.

The content of the structural unit (B) derived from a (meth)acrylic acid alkyl ester and/or the structural unit (B) derived from a (meth)acrylic acid alkoxyalkyl ester in the acrylic copolymer of the present invention, relative to the total content of structural units in the acrylic copolymer, is as follows: the lower limit is preferably 45% by mass or more, more preferably 50% by mass or more, and particularly preferably 60% by mass or more, while the upper limit is preferably 99.5% by mass or less, more preferably 99% by mass or less, and particularly preferably 98.5 by mass or less. Preferred ranges include from 45 to 99.5% by mass; from 45 to 99% by mass; from 45 to 98.5% by mass; from 50 to 99.5% by mass; from 50 to 99% by mass; from 50 to 98.5% by mass; from 60 to 99.5% by mass; from 60 to 99% by mass; and from 60 to 98.5% by mass. The above-defined range of contents of the structural unit (B) is preferred in terms of cold resistance and oil resistance.

The content of the structural unit derived from an acrylic acid alkyl ester, relative to the total content of structural units in the acrylic copolymer, is as follows: the lower limit is preferably 45% by mass or more, more preferably 50% by mass or more, and particularly preferably 60% by mass or more, while the upper limit is preferably 99.5% by mass or less, more preferably 99% by mass or less, and particularly preferably 98.5 by mass or less. Preferred ranges include from 45 to 99.5% by mass; from 45 to 99% by mass; from 45 to 98.5% by mass; from 50 to 99.5% by mass; from 50 to 99% by mass; from 50 to 98.5% by mass; from 60 to 99.5% by mass; from 60 to 99% by mass; and from 60 to 98.5% by mass. The same contents as described above also apply to the structural unit derived from a (meth)acrylic acid alkoxyalkyl ester.

Examples of the structural unit (C) derived from an unsaturated monomer having a crosslinking group in the acrylic copolymer of the present invention include a structural unit derived from an unsaturated monomer having a halogen group (such as a chlorine group), a structural unit derived from an unsaturated monomer having a carboxy group, and a structural unit derived from an unsaturated monomer having an epoxy group. The structural unit derived from an unsaturated monomer having a halogen group (particularly a chlorine group) or the structural unit derived from an unsaturated monomer having a carboxy group is particularly preferred.

Examples of the unsaturated monomer having a halogen group include 2-chloroethyl vinyl ether, 2-chloroethyl acrylate, vinylbenzyl chloride, vinyl monochloroacetate, and allyl chloroacetate.

Examples of the unsaturated monomer having a carboxy group include unsaturated monocarboxylic acids, such as (meth)acrylic acid, crotonic acid, 2-pentenoic acid, and cinnamic acid; unsaturated dicarboxylic acids, such as fumaric acid, maleic acid, and itaconic acid; carboxylic acid anhydrides, such as maleic anhydride and citraconic anhydride; butenedioic acid mono-chain alkyl esters, such as monomethyl fumarate, monoethyl fumarate, mono-n-butyl fumarate, monomethyl maleate, monoethyl maleate, mono-2-ethylhexyl maleate, and mono-n-butyl maleate; butenedioic acid mono-cyclic alkyl esters, such as monocyclopentyl fumarate, monocyclohexyl fumarate, monocyclopentyl maleate, and monocyclohexyl maleate; and itaconic acid monoesters, such as monomethyl itaconate, monoethyl itaconate, mono-n-butyl itaconate, and monocyclohexyl itaconate. Among the above, preferred are unsaturated dicarboxylic acid monoesters, such as monoethyl fumarate, monopropyl fumarate, monobutyl fumarate, monoethyl itaconate, monopropyl itaconate, and monobutyl itaconate.

Examples of the unsaturated monomer having an epoxy group include glycidyl (meth)acrylate and (meth)allyl glycidyl ether.

The content of the structural unit derived from an unsaturated monomer having a crosslinking group in the acrylic copolymer, relative to the total content of structural units in the acrylic copolymer, is preferably 0.1% by mass or more, more preferably 0.3% by mass or more, and particularly preferably 0.5% by mass or more, while it is preferably 10% by mass or less, more preferably 5% by mass or less, and particularly preferably 2.5% by mass or less. Preferred ranges include from 0.1 to 10% by mass; from 0.1 to 5 by mass; from 0.1 to 2.5% by mass; from 0.3 to 10% by mass; from 0.3 to 5% by mass; from 0.3 to 2.5% by mass; from 0.5 to 10% by mass; from 0.5 to 5% by mass; and from 0.5 to 2.5% by mass. The above-defined range of contents of the structural unit derived from an unsaturated monomer having a crosslinking group is preferred in terms of processability and physical properties, such as strength and permanent compression set.

In the acrylic copolymer of the present invention, the total content of the structural unit (A) derived from a monomer containing a structure having an N-substituted maleimide represented by general formula (I), the structural unit (B) derived from a (meth)acrylic acid alkyl ester and/or the structural unit (B) derived from a (meth)acrylic acid alkoxyalkyl ester, and the structural unit (C) derived from an unsaturated monomer having a crosslinking group, relative to the total content of structural units in the acrylic copolymer, is preferably 80% by mass or more, and more preferably 90% by mass or more. The upper limit is preferably 100% by mass or less, 99% by mass or less, or 98% by mass or less. Preferred ranges include from 80 to 100% by mass; from 80 to 99% by mass; from 80 to 98% by mass; from 90 to 100% by mass; from 90 to 99% by mass; and from 90 to 98% by mass.

The acrylic copolymer of the present invention may comprise a structural unit derived from a methacrylic acid alkyl ester. When the acrylic copolymer of the present invention comprises the structural unit derived from a methacrylic acid alkyl ester, it preferably contains the structural unit derived from a methacrylic acid alkyl ester together with the structural unit derived from an acrylic acid alkyl ester. The structural unit derived from a methacrylic acid alkyl ester is preferably a structural unit derived from a methacrylic acid alkyl ester having a $C_{1-16}$ alkyl group, more preferably a structural unit derived from a methacrylic acid alkyl ester having a $C_{1-8}$ alkyl group, and particularly preferably a structural unit derived from a methacrylic acid alkyl ester having a $C_{1-4}$ alkyl group.

Examples of the structural unit derived from a methacrylic acid alkyl ester include structural units derived from methacrylic acid alkyl esters, such as methyl methacrylate, ethyl methacrylate, propyl methacrylate, n-butyl methacrylate, isobutyl methacrylate, n-pentyl methacrylate, n-hexyl methacrylate, n-octyl methacrylate, 2-ethylhexyl methacrylate, n-decyl methacrylate, isodecyl methacrylate, n-dodecyl methacrylate, n-lauryl methacrylate, and n-octadecyl methacrylate. The structural unit derived from a methacrylic acid alkyl ester may be a structural unit derived from a single methacrylic acid alkyl ester or two or more methacrylic acid alkyl esters.

The content of the structural unit derived from a methacrylic acid alkyl ester in the acrylic copolymer of the present invention, relative to the total content of structural units in the acrylic copolymer, may be as follows: the lower limit is 0.5% by mass or more, 1% by mass or more, 1.5% by mass or more, 5% by mass or more, 10% by mass or more, 20% by mass or more, 40% by mass or more, or 50% by mass or more; while the upper limit is 60% by mass or less, 50% by mass or less, 40% by mass or less, 20% by mass or less, 10% by mass or less, 8% by mass or less, or 6% by mass or less. Preferred ranges of the content include from 0.5 to 60% by mass; from 0.5 to 50% by mass; from 0.5 to 40% by mass; from 0.5 to 20% by mass; from 0.5 to 10% by mass; from 0.5 to 8% by mass; from 0.5 to 6% by mass; from 1 to 60% by mass; from 1 to 50% by mass; from 1 to 40% by mass; from 1 to 20% by mass; from 1 to 10% by mass; from 1 to 8% by mass; from 1 to 6% by mass; from 1.5 to 60% by mass; from 1.5 to 50% by mass; from 1.5 to 40% by mass; from 1.5 to 20% by mass; from 1.5 to 10% by mass; from 1.5 to 8% by mass; from 1.5 to 6% by mass; from 5 to 60% by mass; from 5 to 50% by mass; from 5 to 40% by mass; from 5 to 20% by mass; from 5 to 10% by mass; from 5 to 8% by mass; from 5 to 6% by mass; from 10 to 60% by mass; from 10 to 50% by mass; from 10 to 40% by mass; from 10 to 20% by mass; from 20 to 60% by mass; from 20 to 50% by mass; from 20 to 40% by mass; from 40 to 60% by mass; from 40 to 50% by mass; and from 50 to 60% by mass. The above-defined range of contents of the structural unit derived from a methacrylic acid alkyl ester is preferred in terms of heat resistance, oil resistance, and cold resistance.

Besides the above-described structural units, the acrylic copolymer of the present invention may further contain structural units derived from other monomers copolymerizable with these structural units. Examples of other structural units include a structural unit derived from an ethylenically unsaturated nitrile, a structural unit derived from a (meth)acrylamide-based monomer, a structural unit derived from an aromatic vinyl-based monomer, a structural unit derived from a conjugated diene-based monomer, a structural unit derived from a nonconjugated diene, and structural units derived from other olefins.

Examples of the structural unit derived from an ethylenically unsaturated nitrile include structural units derived from compounds such as acrylonitrile, methacrylonitrile, α-methoxyacrylonitrile, and vinylidene cyanide.

Examples of the structural unit derived from a (meth)acrylamide-based monomer include structural units derived from compounds such as acrylamide, methacrylamide, diacetone acrylamide, diacetone methacrylamide, N-butoxymethylacrylamide, N-butoxymethylmethacrylamide, N-butoxyethylacrylamide, N-butoxyethylmethacrylamide, N-methoxymethylacrylamide, N-methoxymethylmethacrylamide, N-propyoxymethylacrylamide, N-propyoxymethylmethacrylamide, N-methylacrylamide, N-methylmethacrylamide, N,N-dimethylacrylamide, N,N-dimethylmethacrylamide, N,N-diethylacrylamide, N,N-diethylmethacrylamide, N-methylolacrylamide, N-methylolmethacrylamide, ethacrylamide, crotonamide, cinnamamide, maleic acid diamide, itaconic acid diamide, methylmaleic acid amide, methylitaconic acid amide, maleic acid imide, and itaconic acid imide.

Examples of the structural unit derived from an aromatic vinyl-based monomer include structural units derived from compounds such as styrene, α-methylstyrene, o-methylstyrene, p-methylstyrene, o-ethylstyrene, p-ethylstyrene, α-fluorostyrene, p-trifluoromethylstyrene, p-methoxystyrene, p-aminostyrene, p-dimethylaminostyrene, p-acetoxystyrene, styrenesulfonic acids or salts thereof, α-vinylnaphthalene, 1-vinylnaphthalene-4-sulfonic acid or salts thereof, 2-vinylfluorene, 2-vinylpyridine, 4-vinylpyridine, divinylbenzene, diisopropenylbenzene, and vinylbenzyl chloride.

Examples of the structural unit derived from a conjugated diene-based monomer include structural units derived from compounds such as 1,3-butadiene, 2-methyl-1,3-butadiene, 2-chloro-1,3-butadiene, 1,2-dichloro-1,3-butadiene, 2,3-dichloro-1,3-butadiene, 2,3-dimethyl-1,3-butadiene, 2-neopentyl-1,3-butadiene, 2-bromo-1,3-butadiene, 2-cyano-1,3-butadiene, 1,3-pentadiene, 1,3-hexadiene, chloroprene, and piperylene.

Examples of the structural unit derived from a nonconjugated diene include structural units derived from nonconjugated diene compounds, such as 1,4-pentadiene, 1,4-hexadiene, ethylidene norbornene, norbornadiene, and dicyclopentadiene.

Examples of the structural units derived from other olefin-based monomers include structural units derived from esters such as dicyclopentadienyl acrylate, dicyclopentadienyl methacrylate, dicyclopentadienyl ethyl acrylate, and dicyclopentadienyl ethyl methacrylate, and from compounds such as ethylene, propylene, vinyl chloride, vinylidene chloride, 1,2-dichloroethylene, vinyl acetate, vinyl fluoride, vinylidene fluoride, 1,2-difluoroethylene, vinyl bromide, vinylidene bromide, 1,2-dibromoethylene, ethyl vinyl ether, and butyl vinyl ether.

In the acrylic copolymer of the present invention, the content of the structural units derived from other copolymerizable monomers, relative to the total content of structural units, may be 0 to 15% by mass, 0 to 10% by mass, or 0 to 5% by mass.

From the viewpoint of processability, the molecular weight of the acrylic copolymer of the present invention preferably is in the range of 10 to 100, more preferably in the range of 15 to 90, and still more preferably in the range of 20 to 80, in terms of Mooney viscosity (ML1+4) at 100° C. in the Mooney scorch test as defined in JIS K 6300.

<Method for Producing Acrylic Copolymer>

The acrylic copolymer used in the present invention can be obtained by polymerizing the monomers that form the above-described structural units. Each of the monomers to be used is not limited, and may be a commercially available product.

While the polymerization reaction may be carried out using any of a method such as emulsion polymerization, suspension polymerization, block polymerization, and solution polymerization, emulsion polymerization under ambient pressure, which is commonly used as a conventionally known method for producing acrylic copolymers, is preferred in terms of ease of controlling the polymerization reaction.

When the polymerization is carried out using emulsion polymerization, a general method may be used, and conventionally known polymerization initiators, emulsifiers, chain transfer agents, polymerization terminators, and the like that are commonly used may be employed.

The emulsifier to be used in the present invention is not limited, and may be a nonionic emulsifier, an anionic emulsifier, or the like that is commonly used in emulsion polymerization. Examples of nonionic emulsifiers include polyoxyethylene alkyl ethers, polyoxyethylene alcohol ethers, polyoxyethylene alkyl phenyl ethers, polyoxyethylene polycyclic phenyl ethers, polyoxyalkylene alkyl ethers, sorbitan fatty acid esters, polyoxyethylene fatty acid esters, and polyoxyethylene sorbitan fatty acid esters. Examples of anionic emulsifiers include alkylbenzene sulfonates, alkyl sulfates, polyoxyethylene alkyl ether sulfates, and polyoxyalkylene alkyl ether phosphates or salts or fatty acid salts thereof. These emulsifiers may be used alone or in combination.

In the present invention, the emulsifier may be used in an amount that is commonly used in emulsion polymerization. Specifically, the amount of the emulsifier is preferably in the range of 0.01 to 10% by mass, relative to the amount of the charged monomers; it is more preferably 0.03% by mass or more, and still more preferably 0.05% by mass or more, while it is more preferably 7% by mass or less, and still more preferably 5% by mass or less. More preferred ranges include from 0.01 to 7% by mass; from 0.01 to 5% by mass; from 0.03 to 10% by mass; from 0.03 to 7% by mass; from 0.03 to 5% by mass; from 0.05 to 10% by mass; from 0.05 to 7% by mass; and from 0.05 to 5% by mass. When a reactive surfactant is used as a monomer component, the addition of emulsifier is not necessarily required.

The polymerization initiator to be used in the present invention is not limited, and may be a polymerization initiator that is commonly used in emulsion polymerization. Specific examples include inorganic polymerization initiators represented by persulfates, such as potassium persulfate, sodium persulfate, and ammonium persulfate; organic peroxide-based polymerization initiators, such as 2,2-di(4,4-di-(t-butylperoxy)cyclohexyl)propane, 1-di-(t-hexylperoxy)cyclohexane, 1,1-di-(t-butylperoxy)cyclohexane, n-butyl 4,4-di-(t-butylperoxy)valerate, 2,2-di(t-butylperoxy)butane, t-butyl hydroperoxide, cumene hydroperoxide, diisopropylbenzene hydroperoxide, p-menthane hydroperoxide, 1,1,3,3-tetramethylbutyl hydroperoxide, t-butyl cumyl peroxide, di-t-butyl peroxide, di-t-hexyl peroxide, di(2-t-butylperoxyisopropyl)benzene, dicumyl peroxide, diisobutyryl peroxide, di(3,5,5-trimethylhexanoyl) peroxide, dilauroyl peroxide, disuccinic acid peroxide, dibenzoyl peroxide, di(3-methylbenzoyl) peroxide, benzoyl(3-methylbenzoyl) peroxide, diisopropyl peroxydicarbonate, di-n-propyl peroxydicarbonate, di(4-t-butylcyclohexyl) peroxydicarbonate, di(2-ethylhexyl) peroxydicarbonate, di-sec-butyl peroxydicarbonate, cumyl peroxyneodecanoate, 1,1,3,3-tetramethylbutyl peroxyneodecanoate, t-hexyl peroxyneodecanoate, t-butyl peroxyneodecanoate, t-hexyl peroxypivalate, t-butyl peroxypivalate, 2,5-dimethyl-2,5-di(2-ethylhexanoylperoxy)hexane, 1,1,3,3-tetramethylbutyl peroxy-2-ethylhexanoate, t-hexyl peroxy-2-ethylhexanoate, t-butyl peroxy-2-ethylhexanoate, t-butylperoxy laurate, t-butylperoxy-3,5,5-trimethylhexanoate, t-hexylperoxyisopropyl monocarbonate, t-butylperoxyisopropyl monocarbonate, t-butylperoxy-2-ethylhexyl monocarbonate, 2,5-dimethyl-2,5-di(benzoylperoxy)hexane, t-butylperoxy acetate, t-hexylperoxy benzoate, t-butylperoxy benzoate, and 2,5-dimethyl-2,5-di(t-butylperoxy)hexane; and hydroperoxides; azo-based initiators, such as azobisisobutyronitrile, 4-4'-azobis(4-cyanovaleric acid), 2-2'-azobis[2-(2-imidazolin-2-yl)propane, 2-2'-azobis(propane-2-carboamidine)

2-2'-azobis[N-(2-carboxyethyl)-2-methylpropanamide, 2-2'-azobis{2-[1-(2-hydroxyethyl)-2-imidazolin-2-yl]propane}, 2-2'-azobis(1-imino-1-pyrrolidino-2-methylpropane), and 2-2'-azobis{2-methyl-N-[1,1-bis(hydroxymethyl)-2-hydroxyethyl]propanamide}.

These polymerization initiators may be used alone or in combination.

In the present invention, the polymerization initiator may be used in an amount that is commonly used in emulsion polymerization. Specifically, the amount of the polymerization initiator is preferably in the range of 0.01 to 5% by mass, relative to the amount of the charged monomers; it is more preferably 0.01% by mass or more, and still more preferably 0.02% by mass or more, while it is more preferably 4% by mass or less, and still more preferably 3% by mass or less. More preferred ranges include from 0.01 to 4% by mass; from 0.01 to 3% by mass; from 0.02 to 5% by mass; from 0.02 to 4% by mass; and from 0.02 to 3% by mass.

An organic peroxide or an inorganic peroxide serving as the polymerization initiator may be combined with a reducing agent to be used as a redox polymerization initiator. Examples of the reducing agent to be used in combination include, but are not limited to, compounds containing metal ions in a reduced state, such as ferrous sulfate and copper(I) naphthenate, methane compounds, such as sodium methanesulfonate, amine compounds, such as dimethylaniline, ascorbic acid and salts thereof, and reducing inorganic salts, such as alkali metal salts of sulfurous acid and thiosulfuric acid. These reducing agents may be used alone or in combination. The reducing agent is preferably used in an amount of 0.0003 to 10.0 parts by mass per 100 parts by mass of the charged monomers.

A chain transfer agent may be optionally used. Specific examples of the chain transfer agent include alkyl mercaptans, such as n-hexyl mercaptan, n-octyl mercaptan, t-octyl mercaptan, n-dodecyl mercaptan, t-dodecyl mercaptan, and n-stearyl mercaptan; xanthogen compounds, such as 2,4-diphenyl-4-methyl-1-pentene, 2,4-diphenyl-4-methyl-2-pentene, dimethyl xanthogendisulfide, and diisopropyl xanthogendisulfide; thiuram-based compounds, such as terpinolene, tetramethyl thiuram disulfide, tetraethyl thiuram disulfide, and tetramethyl thiuram monosulfide; phenol-based compounds, such as 2,6-di-t-butyl-4-methylphenol and styrenated phenol; allyl compounds, such as allyl alcohol, halogenated hydrocarbon compounds, such as dichloromethane, dibromomethane, and carbon tetrabromide; vinyl ethers, such as α-benzyloxystyrene, α-benzyloxyacrylonitrile, and α-benzyloxyacrylamide; triphenyl ethane, pentaphenyl ethane, acrolein, methacrolein, thioglycolic acid, thiomalic acid, and 2-ethylhexyl thioglycolate. These chain transfer agents may be used alone or in combination. The chain transfer agent is typically used in an amount of 0 to 5 parts by mass per 100 parts by mass of the charged monomers, although the amount is not limited thereto.

Examples of the polymerization terminator include hydroxylamines, hydroxyamine sulfates, diethylhydroxyamine, hydroxyamine sulfonic acid and alkali metal salts thereof, sodium dimethyldithiocarbamate, and quinone compounds such as hydroquinone. The polymerization terminator is typically used in an amount of 0 to 2 parts by mass per 100 parts by mass of total monomers, although the amount is not limited thereto.

The pH of the polymer obtained using the above-described method may be optionally adjusted using a base as a pH adjuster. Specific examples of the base include sodium hydroxide, potassium hydroxide, calcium hydroxide, ammonia, inorganic ammonium compounds, and organic amine compounds. The pH range is preferably pH 1 to 11, more preferably pH 1.5 or more, and still more preferably pH 2 or more, while it is more preferably pH 10.5 or less, and still more preferably pH 10 or less. More preferred pH ranges include from 1 to 10.5; from 1 to 10; from 1.5 to 11; from 1.5 to 10.5; from 1.5 to 10; from 2 to 11; from 2 to 10.5; and from 2 to 10.

Besides the above-described components, polymerization auxiliary materials, such as particle size adjusters, chelating agents, and oxygen scavengers, may be used.

Emulsion polymerization may be carried out in any of batch mode, semi-batch mode, and continuous mode. The polymerization time and the polymerization temperature are not limited. While the polymerization time and the polymerization temperature may be selected appropriately according to the type of the polymerization initiator to be used and the like, the polymerization temperature is typically 10 to 100° C., and the polymerization time is typically 0.5 to 100 hours.

The method for recovering the polymer obtained using the above-described method is not limited, and may be a commonly used method. In one exemplary method, the polymerization solution is fed continuously or in batch mode to an aqueous solution containing a coagulant. By this operation, a coagulated slurry is obtained. The temperature of the aqueous solution containing a coagulant is typically in the range of 50° C. or more, and more preferably in the range of 60 to 100° C., although it cannot be uniformly specified because it varies with the types and amounts of the monomers used, and coagulation conditions such as shear force generated by stirring or the like.

The coagulated slurry obtained using the above-described method is preferably washed with water to remove the coagulant. No wash with water or insufficient washing may possibly cause residual ions derived from the coagulant to precipitate in a molding step.

The acrylic copolymer can be obtained by drying the coagulated slurry after washing with water to remove the water. The drying is typically performed using a flash dryer, a fluidized dryer, or the like, although the method of drying is not limited thereto. A dehydration step using a centrifuge or the like may be performed prior to the drying step <Acrylic Copolymer-Containing Composition>

The acrylic copolymer-containing composition of the present invention comprises at least the above-described acrylic copolymer and a crosslinking agent.

The crosslinking agent may be a conventionally known crosslinking agent that is typically used in the crosslinking of rubber, including polyamine compounds, polyepoxy compounds, polyisocyanate compounds, aziridine compounds, sulfur compounds, basic metal oxides, organic metal halides, higher fatty acid metal salts (fatty acid metal soaps), and thiol compounds. Among the above, polyamine compounds are preferably used.

Examples of polyamine compounds include aliphatic polyamine compounds, such as hexamethylenediamine, hexamethylenediamine carbamate, and N,N'-dicinnamylidene-1,6-hexanediamine; and aromatic polyamine compounds, such as 4,4'-methylenedianiline, m-phenylenediamine, 4,4'-diaminodiphenyl ether, 3,4'-diaminodiphenyl ether, 4,4'-(m-phenylenediisopropylidene)dianiline, 4,4'-(p-phenylenediisopropylidene)dianiline, 2,2'-bis[4-(4-aminophenoxy)phenyl]propane, 4,4'-diaminobenzanilide, 4,4'-bis(4-aminophenoxy)biphenyl, m-xylylene diamine, p-xylylene diamine, 1,3,5-benzenetriamine, 1,3,5-benzenetriaminomethyl, and isophthalic dihydrazide.

Examples of polyepoxy compounds include glycidyl ether-type epoxy compounds, such as phenol novolac-type epoxy compounds, cresol novolac-type epoxy compounds, cresol-type epoxy compounds, bisphenol A-type epoxy compounds, bisphenol F-type epoxy compounds, brominated bisphenol A-type epoxy compounds, brominated bisphenol F-type epoxy compounds, and hydrogenated bisphenol A-type epoxy compounds; and other polyepoxy compounds, such as cycloaliphatic epoxy compounds, glycidyl ester-type epoxy compounds, glycidyl amine-type epoxy compounds, and isocyanurate-type epoxy compounds.

Examples of polyisocyanate compounds include 2,4-tolylene diisocyanate, 2,6-tolylene diisocyanate, 4,4'-diphenylmethane diisocyanate, hexamethylene diisocyanate, p-phenylene diisocyanate, m-phenylene diisocyanate, 1,5- naphtylene diisocyanate, 1,3,6-hexamethylene triisocyanate, 1,6,11-undecane triisocyanate, and bicycloheptane triisocyanate.

Examples of aziridine compounds include tris-2,4,6-(1-aziridinyl)-1,3,5-triazine, tris[1-(2-methyl)aziridinyl]phosphinoxide, and hexa[1-(2-methyl)aziridinyl]triphosphatriazine.

Examples of sulfur compounds include sulfur, 4,4'-dithiomorpholine, tetramethyl thiuram disulfide, and tetraethyl thiuram disulfide.

Examples of basic metal oxides include zinc oxide, lead oxide, calcium oxide, and magnesium oxide.

Examples of organic metal halides include dicyclopentadienyl metal dihalides, and examples of metals include titanium and zirconium.

Examples of higher fatty acid metal salts include alkali metal salts or alkaline earth metal salts of fatty acids having $C_8$–$_{18}$ alkyl or alkenyl groups, for example, sodium stearate, potassium stearate, potassium myristate, sodium palmitate, calcium stearate, magnesium stearate, sodium oleate, potassium oleate, and barium oleate. These higher fatty acid metal salts may be used alone or in combination.

Examples of thiol compounds include 1,3,5-triazine dithiol or derivatives thereof and 1,3,5-triazine trithiol.

These crosslinking agents may be used alone or in combination. The amount of the crosslinking agent per 100 parts by mass of the acrylic copolymer of the present invention is preferably 0.05 part by mass or more, more preferably 0.1 part by mass or more, and particularly preferably 0.3 part by mass or more, while it is preferably 20 parts by mass or less, more preferably 5 parts by mass or less, and particularly preferably 2.5 parts by mass or less. Preferred ranges of the amount of the crosslinking agent, per 100 parts by mass of the acrylic copolymer of the present invention, include from 0.05 to 20 parts by mass; from 0.05 to 5 parts by mass; from 0.05 to 2.5 parts by mass; from 0.1 to 20 parts by mass; from 0.1 to 5 parts by mass; from 0.1 to 2.5 parts by mass; from 0.3 to 20 parts by mass; from 0.3 to 5 parts by mass; and from 0.3 to 2.5 parts by mass.

The acrylic copolymer-containing composition of the present invention may also optionally contain other additives that are typically used in the art, for example, lubricants, softeners, anti-aging agents, light stabilizers, fillers, reinforcing agents, plasticizers, processing aids, pigments, colorants, crosslinking accelerators, crosslinking aids, crosslinking retarding agents, antistatic agents, and foaming agents.

Examples of softeners include lubricants, process oils, coal tar, castor oil, stearic acid, and calcium stearate.

Examples of anti-aging agents include amines, phosphates, quinolines, cresols, phenols, and dithiocarbamate metal salts. Preferred are amines, such as diphenylamine derivatives and phenylenediamine derivatives.

Examples of crosslinking accelerators include guanidine compounds, amine compounds, thiourea compounds, thiazole compounds, sulfenamide compounds, thiuram compounds, and quarternary ammonium salts. Preferred are guanidine compounds and amine compounds.

Examples of guanidine compounds include 1,3-diphenylguanidine and 1,3-di-o-tolylguanidine.

Examples of amine compounds include secondary amine compounds, such as dimethylamine, diethylamine, dipropylamine, diallylamine, diisopropylamine, di-n-butylamine, di-t-butylamine, di-sec-butylamine, dihexylamine, diheptylamine, dioctylamine, dinonylamine, didecylamine, diundecylamine, didodecylamine, ditridecylamine, ditetradecylamine, dipentadecylamine, dicetylamine, di-2-ethylhexylamine, and dioctadecylamine; and tertiary amine compounds, such as trimethylamine, triethylamine, tripropylamine, triallylamine, triisopropylamine, tri-n-butylamine, tri-t-butylamine, tri-sec-butylamine, trihexylamine, triheptylamine, trioctylamine, trinonylamine, tridecylamine, triundecylamine, and tridodecylamine.

The acrylic copolymer of the present invention may be blended with rubbers, resins, and the like, in a manner that is typically used in the art, without departing from the spirit of the present invention. Examples of rubbers that may be used in the present invention include butadiene rubber, styrene-butadiene rubber, isoprene rubber, natural rubber, acrylonitrile-butadiene rubber, acrylonitrile-butadiene-isoprene rubber, acrylic rubber, ethylene acrylic rubber, ethylene-propylene-diene rubber, and epichlorohydrin rubber. Examples of resins include PMMA (polymethyl methacrylate) resin, PS (polystyrene) resin, PUR (polyurethane) resin, PVC (polyvinyl chloride) resin, EVA (ethylene/vinyl acetate) resin, AS (styrene/acrylonitrile) resin, and PE (polyethylene) resin.

The total amount of the rubbers and resins to be blended per 100 parts by mass of the acrylic copolymer of the present invention is 50 parts by mass or less, preferably 10 parts by mass or less, and more preferably 1 part by mass or less.

Blending of the acrylic copolymer-containing composition of the present invention may be performed using any method that is conventionally employed in the art of polymer processing, for example, an open roll, a Banbury mixer, or any of various kneaders.

The blending procedure may be a typical procedure used in the art of polymer processing. For example, blending may be performed by the following procedure: The polymer only is kneaded first, and then a kneading A compound is produced by kneading A in which compounding ingredients other than a crosslinking agent and a crosslinking accelerator are charged, and thereafter, kneading B is performed in which a crosslinking agent and a crosslinking accelerator are charged.

A rubber material can be produced from the composition of the present invention (specifically, the composition of the present invention is typically heated to 100 to 250° C. to form a crosslinked product). While the crosslinking time varies with temperature, it is usually between 0.5 and 300 minutes. Crosslinking and molding may be performed by any of the following manners: crosslinking and molding are integrally performed; the acrylic copolymer-containing composition that has been molded in advance is heated again to form a crosslinked product; and the acrylic copolymer-containing composition is heated in advance, and the crosslinked product is subjected to processing for molding. Crosslinking and molding may be specifically performed using any method, such as compression molding with a mold, injection molding, or heating using steam cans, air baths, infrared radiation, or microwaves.

The acrylic copolymer-containing composition of the present invention thus obtained has excellent roll processability during processing, and the crosslinked product of the present invention has excellent heat resistance with a small rate of change in strength, without loss of elongation, even under a long-term high-temperature condition.

Therefore, by utilizing the above-described properties, the crosslinked product of the present invention is suitably used as O-rings, packings, diaphragms, oil seals, shaft seals, bearing seals, mechanical seals, wellhead seals, seals for electrical and electronic equipment, seals for pneumatic equipment, cylinder head gaskets mounted on joints between cylinder blocks and cylinder heads, rocker cover gaskets mounted on joints between rocker covers and cylinder heads, oil pan gaskets mounted on joints between oil pans and cylinder blocks or transmission cases, gaskets for fuel cell separators mounted between a pair of housings between which a unit cell including a positive electrode, an electrolyte plate, and a negative electrode is sandwiched, gaskets for top covers of hard disk drives, and other various gaskets.

The crosslinked product of the present invention can also be used as a rubber material, and can be suitably used as extrusion molded articles and mold-crosslinked articles used for automotive applications, that is, as various hoses including fuel oil system hoses around fuel tanks, such as fuel hoses, filler neck hoses, vent hoses, vapor hoses, and oil hoses, air system hoses such as turbo air hoses and emission control hoses, radiator hoses, heater hoses, brake hoses, and air-conditioner hoses.

EXAMPLES

The present invention will be described in more detail with reference to examples and comparative examples, although the present invention is not limited thereto.

In the examples and comparative examples, acrylic copolymers were produced, and acrylic copolymer-containing compositions containing the acrylic copolymers and crosslinking agents were produced, and the physical properties of rubber materials produced using (specifically crosslinked products obtained by crosslinking) the acrylic copolymer-containing compositions were evaluated.

Example 1

(Production of Acrylic Copolymer A)

A polymerization reactor equipped with a thermometer, a stirrer, a nitrogen inlet tube, and a pressure-reducing device was charged with 200 parts by mass of water and 1.7 parts by mass of a polyoxyalkylene alkyl ether phosphate, as well as 49.3 parts by mass of ethyl acrylate, 48.8 parts by mass of n-butyl acrylate, 0.5 part by mass of N-(4-anilinophenyl)maleimide, and 1.4 parts by mass of monoethyl fumarate as monomers. Degassing under a reduced pressure and nitrogen purging were repeated to sufficiently remove oxygen. Then, 0.1 part by mass of sodium ascorbate and 0.1 part by mass of potassium persulfate were added to initiate the emulsion polymerization reaction at ambient pressure and temperature. The reaction was continued until the polymerization conversion reached 95%, and 0.0075 part by mass of hydroquinone was added to terminate the polymerization. The resulting polymerized emulsion was coagulated with an aqueous solution of sodium sulfate, washed with water, and dried to obtain acrylic copolymer A.

Example 2

(Production of Acrylic Copolymer B)

Acrylic copolymer B was obtained as in Example 1, except that the monomers to be charged and the amounts thereof were changed as follows: 49.3 parts by mass of ethyl acrylate, 48.3 parts by mass of n-butyl acrylate, 1.0 part by mass of N-(4-anilinophenyl)maleimide, and 1.4 parts by mass of monoethyl fumarate.

Example 3

(Production of Acrylic Copolymer C)

Acrylic copolymer C was obtained as in Example 1, except that the monomers to be charged and the amounts thereof were changed as follows: 49.3 parts by mass of ethyl acrylate, 44.0 parts by mass of n-butyl acrylate, 4.8 parts by mass of methyl methacrylate, 0.5 part by mass of N-(4-anilinophenyl)maleimide, and 1.4 parts by mass of monoethyl fumarate.

Example 4

(Production of Acrylic Copolymer D)

Acrylic copolymer D was obtained as in Example 1, except that the monomers to be charged and the amounts thereof were changed as follows: 49.3 parts by mass of ethyl acrylate, 48.3 parts by mass of n-butyl acrylate, 0.5 part by mass of 4-hydroxyphenyl maleimide, and 1.4 parts by mass of monoethyl fumarate.

Comparative Example 1

(Production of Acrylic Copolymer E)

Acrylic copolymer E was obtained as in Example 1, except that the monomers to be charged and the amounts thereof were changed as follows: 49.3 parts by mass of ethyl acrylate, 49.3 parts by mass of n-butyl acrylate, and 1.4 parts by mass of monoethyl fumarate.

Comparative Example 2

(Production of Acrylic Copolymer F)

Acrylic copolymer F was obtained as in Example 1, except that the monomers to be charged and the amounts thereof were changed as follows: 49.3 parts by mass of ethyl acrylate, 44.5 parts by mass of n-butyl acrylate, 4.8 parts by mass of methyl methacrylate, and 1.4 parts by mass of monoethyl fumarate.

<Mooney Viscosity ($ML_{1+4}$), 100° C.>

For each of acrylic copolymers A to F, the Mooney viscosity ($ML_{1+4}$) at a measurement temperature of 100° C. was measured using Mooney Viscometer AM-3 available from Toyo Seiki Co., Ltd., in accordance with the Mooney viscosity test using the method for testing the physical properties of uncrosslinked rubber as defined in JIS K 6300. The results are shown in Table 1.

TABLE 1

| | | | Example 1 | Example 2 | Example 3 | Example 4 | Comparative Example 1 | Comparative Example 2 |
|---|---|---|---|---|---|---|---|---|
| Acrylic copolymer | | Designation | A | B | C | D | E | F |
| | Composition (% by mass) | Ethyl acrylate | 49.3 | 49.3 | 49.3 | 49.3 | 49.3 | 49.3 |
| | | n-Butyl acrylate | 48.8 | 48.3 | 44.0 | 48.8 | 49.3 | 44.5 |
| | | Methyl methacrylate | 0 | 0 | 4.8 | 0 | 0 | 4.8 |
| | | N-(4-anilinophenyl)maleimide | 0.5 | 1.0 | 0.5 | 0 | 0 | 0 |
| | | 4-Hydroxyphenyl maleimide | 0 | 0 | 0 | 0.5 | 0 | 0 |
| | | Monoethyl fumarate | 1.4 | 1.4 | 1.4 | 1.4 | 1.4 | 1.4 |
| | Polymer Mooney viscosity (ML1 + 4, 100° C.) | | 36 | 34 | 47 | 23 | 34 | 44 |

(Production of Acrylic Copolymer-Containing Composition)

The compounding ingredients shown in Tables 2 and 3 were kneaded first in a kneader at 120° C. to prepare a kneading A compound. The kneading A compound was kneaded in an open roll at room temperature, and a kneading B compound was produced. In the tables, the section "A" lists the ingredients of the kneading A compound, and the section "B" lists the ingredients blended to the kneading A compound during the preparation of the kneading B compound. The unit for the compounding ingredients shown in Tables 2 and 3 is part(s) by mass.

(Production of Uncrosslinked Sheet)

Each of the acrylic copolymer-containing compositions obtained above was kneaded in a kneader and an open roll to produce an uncrosslinked sheet with a thickness of 2 to 2.5 mm.

(Mooney Scorch Test)

For the uncrosslinked sheet, the Mooney scorch test as defined in JIS K 6300 was performed at 125° C. using Mooney Viscometer AM-3 available from Toyo Seiki Co., Ltd. The results are shown in Tables 2 and 3.

(Production of Rubber Material (Crosslinked Product))

The uncrosslinked rubber sheet obtained above was subjected to a press process at 180° C. for 10 minutes, and then heated in an air oven at 180° C. for 3 hours to obtain a crosslinked product.

(Test of Physical Properties under Normal Conditions)

The crosslinked product was evaluated by a tensile test using AGS-5KNY available from Shimadzu Corporation. The tensile test was performed in accordance with the method as defined in JIS K 6251. The results are shown in Tables 2 and 3.

(Heat Aging Test)

The above-described crosslinked product was heat-aged by heating at 190° C. for 336 or 504 hours. After the heat aging, evaluation by the tensile test was performed as in the test of physical properties under normal conditions. The results are shown in Tables 2 and 3.

Tables 2 and 3 show the test results for the examples and comparative examples obtained using the above-described testing methods.

In each table, $t_5$ denotes the Mooney scorch time as defined in the Mooney scorch test according to JIS K 6300; 100% modulus denotes the stress at 100% elongation; TB denotes the strength as defined in the tensile test according to JIS K 6251; and EB denotes the elongation as defined in the tensile test according to JIS K6251. ΔTB and ΔEB each represent the rate of change in TB and EB, respectively, relative to the physical properties under normal conditions (before the heat aging test). The results are shown in Tables 2 and 3.

TABLE 2

| Kneading | Ingredients | | Example 5 | Example 6 | Example 7 | Comparative Example 3 | Comparative Example 4 |
|---|---|---|---|---|---|---|---|
| A | Acrylic copolymer A | | 100 | | | | |
| | Acrylic copolymer B | | | 100 | | | |
| | Acrylic copolymer E | | | | | 100 | 100 |
| | Acrylic copolymer D | | | | 100 | | |
| | Carbon black N550 | | 60 | 60 | 60 | 60 | 60 |
| | Stearic acid | | 2 | 2 | 2 | 2 | 2 |
| | 4,4'-Bis(α,α-dimethylbenzyl)diphenylamine | | 2 | 2 | 2 | 2 | 2 |
| B | Hexamethylenediamine carbamate | | 0.6 | 0.6 | 0.6 | 0.6 | 0.6 |
| | Di-o-tolylguanidine | | 2 | 2 | 2 | 2 | 2 |
| | N-(4-anilinophenyl)maleimide | | | | | | 1.23 |
| | Acrylic copolymer-containing composition Mooney scorch time ($t_5$(min.)) | | 4.8 | 4.9 | 6 | 4.9 | 5.5 |
| Rubber material (crosslinked product) | Physical properties under normal conditions | 100% modulus (MPa) | 9.8 | 9.8 | 5.8 | 4.9 | 5.3 |
| | | Strength TB (MPa) | 11.2 | 11.2 | 11.4 | 8.2 | 10.8 |
| | | Elongation EB (%) | 199 | 199 | 194 | 182 | 205 |
| | Heat aging test (336H) | ΔTB (%) | −20 | −13 | −26 | −35 | −45 |
| | Heat aging test (504H) | ΔTB (%) | −30 | −26 | −33 | −41 | −43 |
| | | ΔEB (%) | −71 | −76 | −75 | −75 | −73 |

TABLE 3

| Kneading | Ingredients | | Example 8 | Comparative Example 5 |
|---|---|---|---|---|
| A | Acrylic copolymer C | | 100 | |
| | Acrylic copolymer F | | | 100 |
| | Carbon black N550 | | 60 | 60 |
| | Stearic acid | | 2 | 2 |
| | 4,4'-Bis(a,a-dimethylbenzyl)diphenylamine | | 2 | 2 |
| B | Hexamethylenediamine carbamate | | 0.6 | 0.6 |
| | Di-o-tolylguanidine | | 2 | 2 |
| | Acrylic copolymer-containing composition Mooney scorch time ($t_5$(min.)) | | 5.1 | 5.3 |
| Rubber material (crosslinked product) | Physical properties under normal conditions | 100% modulus (MPa) | 5.2 | 3.8 |
| | | Strength TB (MPa) | 12.5 | 7.9 |
| | | Elongation EB (%) | 225 | 241 |
| | Heat aging test (336 H) | ΔTB (%) | −30 | −53 |
| | Heat aging test (504 H) | ΔTB (%) | −42 | −54 |
| | | ΔEB (%) | −64 | −61 |

As shown in Table 2, the crosslinked products of Examples 5 to 7 obtained by crosslinking the copolymers of the present invention each had a rate of change in strength (ΔTB) after heat aging that is smaller than those of the crosslinked products of Comparative Examples 3 and 4, in the heat aging test.

As shown in Table 3, the crosslinked product of Example 8 obtained by crosslinking the copolymer of the present invention having a structural unit derived from methyl methacrylate also had a rate of change in strength (ΔTB) after heat aging that is smaller than that of the crosslinked product of Comparative Examples 5, in the heat aging test.

These results demonstrate that the crosslinked products obtained by crosslinking the acrylic copolymers of the present invention have a small rate of change in strength and excellent heat resistance, without loss of elongation, even after exposure to a high temperature for a long time.

INDUSTRIAL APPLICABILITY

The acrylic copolymer of the present invention can be extensively used as the materials of rubber articles or resin articles, or as the raw materials of adhesives or coating materials, by utilizing its excellent heat resistance, weather resistance, ozone resistance, and wear resistance. In particular, a crosslinked product produced using the acrylic copolymer of the present invention is extremely effective for automotive applications, such as fuel system hoses or air system hoses and tube materials.

The invention claimed is:

1. An acrylic copolymer consisting of;
   (a) a structural unit (A) derived from a monomer containing a structure having an N-substituted maleimide represented by the following general formula (I),
   (b) a structural unit (B) derived from a (meth)acrylic acid alkyl ester and/or a structural unit (B) derived from a (meth)acrylic acid alkoxyalkyl ester, and
   (c) a structural unit (C) derived from an unsaturated monomer having a crosslinking group:

[Formula 1]

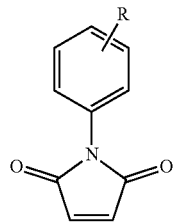

(I)

wherein R is either an optionally substituted anilino group ($C_6H_5$—NH—) or a hydroxyl group, wherein the content of the structural unit (A) is from 0.1 to 2.5% by mass, wherein the content of the structural unit (B) is from 87.5% to 99.8% by mass, wherein the content of the structural unit (C) is from 0.1 to 10% by mass, and wherein the acrylic copolymer has a viscosity of 10 to 100 in terms of Mooney viscosity ($ML1+_4$) at 100° C. in the Mooney scorch test as defined in JIS K 6300.

2. The acrylic copolymer according to claim 1, wherein the structural unit (A) derived from a monomer containing a structure having a maleimide skeleton represented by general formula (I) is a structural unit derived from N-(4-anilinophenyl)maleimide.

3. The acrylic copolymer according to claim 1, wherein the structural unit (A) derived from a monomer containing a structure having a maleimide skeleton represented by general formula (I) is a structural unit derived from hydroxyphenyl maleimide.

4. The acrylic copolymer according to claim 1, wherein the structural unit (C) derived from an unsaturated monomer having a crosslinking group is any of a structural unit derived from an unsaturated monomer having a halogen group, a structural unit derived from an unsaturated monomer having a carboxy group, and a structural unit derived from an unsaturated monomer having an epoxy group.

5. The acrylic copolymer according to claim 1, wherein the structural unit (B) is derived from either a methacrylic acid alkyl ester alone, or from a combination of a (meth)acrylic acid alkyl ester and a (meth)acrylic acid alkoxyalkyl ester.

6. An acrylic copolymer-containing composition comprising the acrylic copolymer according to claim 1 and a crosslinking agent.

7. A rubber material comprising a crosslinked product of the acrylic copolymer-containing composition according to claim 6.

* * * * *